US011892761B2

(12) United States Patent
Chriki et al.

(10) Patent No.: US 11,892,761 B2
(45) Date of Patent: Feb. 6, 2024

(54) IMAGE PROJECTOR USING A PHASE IMAGE GENERATOR

(71) Applicant: Lumus Ltd., Ness Ziona (IL)

(72) Inventors: Ronen Chriki, Lod (IL); Eitan Ronen, Rechovot (IL); Yochay Danziger, Kfar Vradim (IL); Shimon Grabarnik, Rehovot (IL); Tsion Eisenfeld, Ashkelon (IL)

(73) Assignee: Lumus Ltd., Ness Ziona (IL)

( * ) Notice: Subject to any disclaimer, the term of this patent is extended or adjusted under 35 U.S.C. 154(b) by 35 days.

(21) Appl. No.: 17/783,795

(22) PCT Filed: Nov. 29, 2020

(86) PCT No.: PCT/IL2020/051233
§ 371 (c)(1),
(2) Date: Jun. 9, 2022

(87) PCT Pub. No.: WO2021/124315
PCT Pub. Date: Jun. 24, 2021

(65) Prior Publication Data
US 2023/0019309 A1 Jan. 19, 2023

Related U.S. Application Data
(60) Provisional application No. 62/950,207, filed on Dec. 19, 2019.

(51) Int. Cl.
*G02B 27/01* (2006.01)
*G03B 21/28* (2006.01)
(Continued)

(52) U.S. Cl.
CPC ........... *G03B 21/147* (2013.01); *G02B 27/48* (2013.01); *G03B 21/2033* (2013.01); *G03B 21/2066* (2013.01)

(58) Field of Classification Search
CPC ................ G02B 27/0101; G02B 27/48; G02B 2027/0123; G02B 27/0103; G03B 21/2033; G03B 21/28
See application file for complete search history.

(56) References Cited

U.S. PATENT DOCUMENTS

| 5,096,520 A | 3/1992 | Faris |
| 5,398,171 A | 3/1995 | Davenport et al. |
(Continued)

FOREIGN PATENT DOCUMENTS

| GB | 2153546 A | 8/1985 |
| JP | 2015099323 | 5/2015 |

OTHER PUBLICATIONS

Lynch et al. "Beam Manipulation: Prisms Vs. Mirrors", Photonik International pp. 45-47. Mar. 2009. Available since Sep. 20, 2016 at the following URL: <http://www.edmundoptics.com/globalassets/resources/articles/beammanipulation-prisms-vs-mirrors-en.pdf> Lynch et al. Mar. 31, 2009 (Mar. 31, 2009).
(Continued)

*Primary Examiner* — Ryan D Howard
(74) *Attorney, Agent, or Firm* — Mark M. Friedman

(57) ABSTRACT

An image projector with a high optical efficiency projects an image at an arbitrary distance from an observer. The image projector includes an illumination module having at least one spatially coherent light source; a phase image generator with an array of optical phase shifting elements; an electronic image controller connected electrically to the phase image generator; and a waveguide which includes at least one embedded partial reflector. The waveguide may be positioned either between the illumination module and the waveguide, or between the waveguide and the observer. The phase image generator may include phase shifts for canceling speckle, correcting optical aberrations, and/or compen-
(Continued)

sating interference caused by light rays having different optical path lengths.

16 Claims, 10 Drawing Sheets

(51) Int. Cl.
*G03B 21/14* (2006.01)
*G02B 27/48* (2006.01)
*G03B 21/20* (2006.01)

(56) References Cited

U.S. PATENT DOCUMENTS

| | | | |
|---|---|---|---|
| 6,394,607 B1 | 5/2002 | Hashizume et al. | |
| 7,148,936 B1 | 12/2006 | Hirota et al. | |
| 9,551,880 B2 | 1/2017 | Amitai | |
| 10,007,046 B2 | 6/2018 | Chung et al. | |
| 10,859,845 B2 | 12/2020 | Kyosuna et al. | |
| 2002/0075454 A1 | 6/2002 | Hsiung | |
| 2005/0017465 A1 | 1/2005 | Bergstrom | |
| 2007/0000219 A1 | 1/2007 | Hashizume et al. | |
| 2007/0159673 A1* | 7/2007 | Freeman | G02B 6/0028 359/19 |
| 2010/0027289 A1 | 2/2010 | Aiki et al. | |
| 2010/0033784 A1 | 2/2010 | Renaud | |
| 2012/0002256 A1 | 1/2012 | Lacoste et al. | |
| 2012/0068609 A1 | 3/2012 | Ide et al. | |
| 2013/0021581 A1 | 1/2013 | Takahashi et al. | |
| 2013/0335708 A1 | 12/2013 | Ouderkirk | |
| 2015/0013105 A1 | 1/2015 | Kuan | |
| 2015/0288937 A1 | 10/2015 | Tsai et al. | |
| 2016/0313567 A1 | 10/2016 | Kurashige | |
| 2017/0276947 A1 | 9/2017 | Yokoyama | |
| 2018/0120768 A1 | 5/2018 | Christmas | |
| 2018/0129166 A1 | 5/2018 | Seo et al. | |
| 2018/0188532 A1 | 7/2018 | Christmas | |
| 2018/0262725 A1 | 9/2018 | Fan | |
| 2018/0335629 A1 | 11/2018 | Cheng et al. | |
| 2018/0373262 A1* | 12/2018 | Wu | G05D 1/0246 |
| 2019/0022731 A1 | 1/2019 | Yabuoshi | |
| 2019/0196194 A1 | 6/2019 | Montgomery et al. | |
| 2020/0012086 A1 | 1/2020 | Kawahara | |
| 2020/0183079 A1* | 6/2020 | Leister | G02B 6/0055 |
| 2020/0209667 A1 | 7/2020 | Sharlin et al. | |
| 2020/0278558 A1 | 9/2020 | Yamamoto et al. | |
| 2020/0326655 A1* | 10/2020 | Chang | H04N 9/3161 |
| 2022/0197037 A1 | 6/2022 | Pennell et al. | |
| 2022/0317467 A1 | 10/2022 | Danziger | |
| 2022/0342216 A1 | 10/2022 | Danziger et al. | |
| 2022/0373807 A1 | 11/2022 | Danziger et al. | |
| 2023/0019309 A1 | 1/2023 | Chriki et al. | |

OTHER PUBLICATIONS

M. Kivanc Hedili et al."Light-efficient augmented reality display with steerable eyebox", Optics Express vol. 27, Issue 9, pp. 12572-12581 (2019) •https://doi.org/10.1364/OE.27.012572.

* cited by examiner

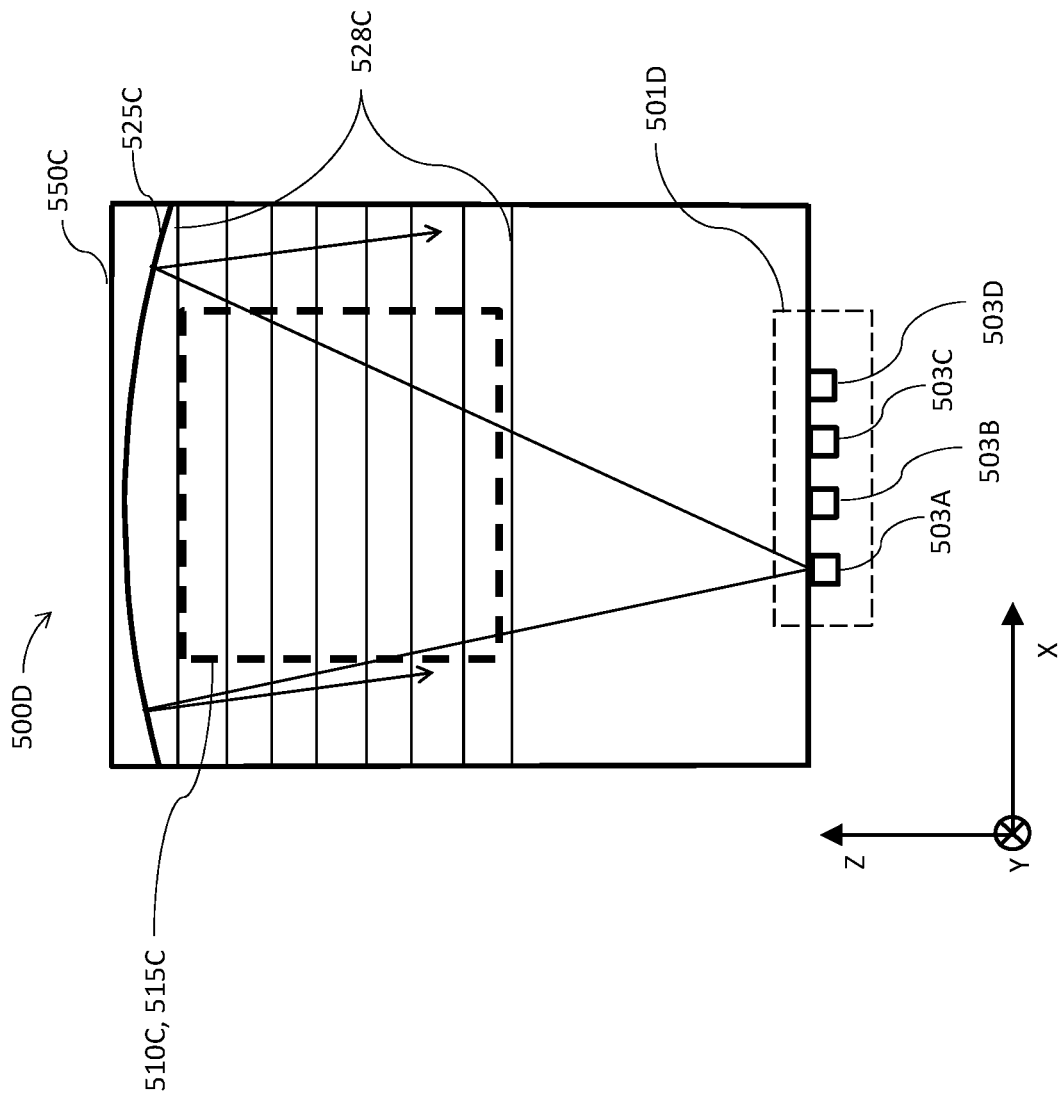

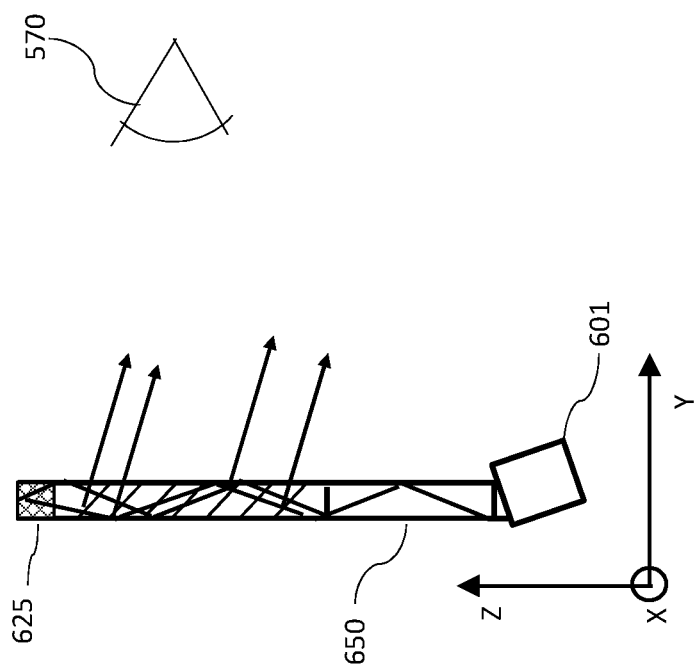
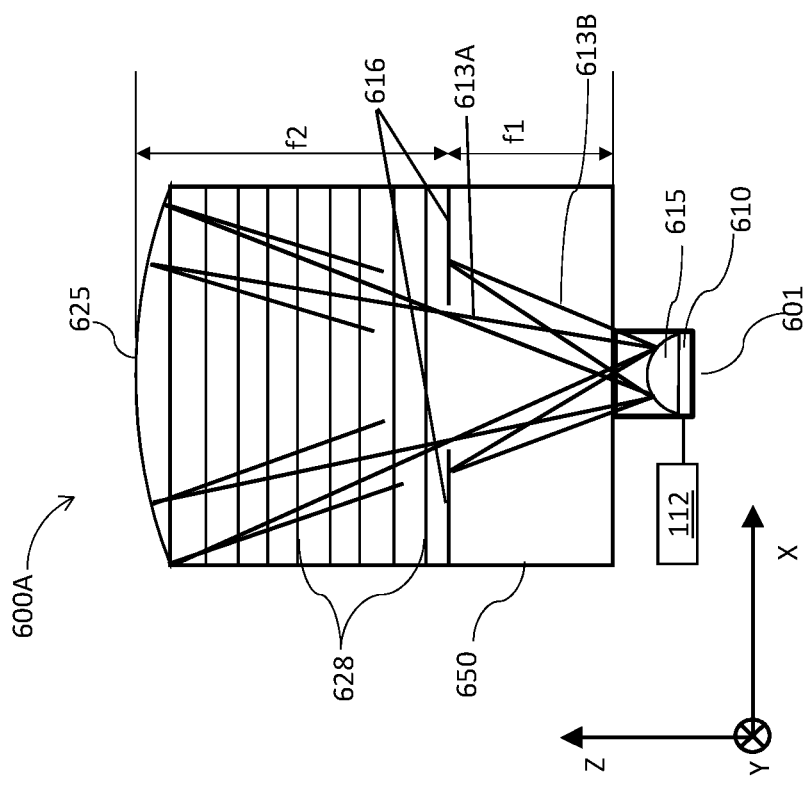
Figure 6B
Figure 6A

IMAGE PROJECTOR USING A PHASE IMAGE GENERATOR

CROSS-REFERENCE TO RELATED APPLICATIONS

This application claims the benefit of U.S. provisional patent application Ser. No. 62/950,207, filed Dec. 19, 2019, by the present inventors, which is incorporated by reference in its entirety herein.

FIELD OF THE INVENTION

The present invention relates to displays, and in particular, to an image projector using a phase image generator.

BACKGROUND

Image projectors, such as those used in near-eye displays, inject an optical image into a waveguide, which then transfers the image to the eyes of an observer. The optical image is formed by modulating the phase and/or amplitude of illuminating light, which is provided by either an incoherent light source or a coherent light source.

In the case of an incoherent light source, the image is typically formed by spatially modulating the light amplitude using, for example, a spatial light modulator (SLM) or a liquid crystal display (LCD). Typically, amplitude modulation of this sort entails a loss of light intensity, which reduces the optical efficiency of the image projector, and is strictly limited to images projected to infinity.

In the case of a coherent light source, illumination is typically provided by a scanning laser system, in which the intensity of a laser beam is modulated in time, and the direction of the laser beam is rapidly scanned by rotating mirrors. Here too, the system is limited to images projected to infinity, and furthermore, the required rotation speed of the scanning mirrors is difficult to achieve.

SUMMARY OF THE INVENTION

The present invention is a compact, optically efficient image projector using a phase image generator, such as a holographic optical element (HOE) or a liquid crystal on silicon device (LCOS). The image is projected at an arbitrary distance from an observer, with little or no loss of light intensity or optical efficiency.

In this application, the term "laser" when used as a noun or an adjective is intended to include a variety of illumination sources used in head-mounted displays, such as laser diodes and light-emitting diodes (LED's), Furthermore, the use of the term "plane" in optical terms, such as image plane and focal plane, is understood as referring to surfaces which may or may not be planar in a strictly mathematical sense.

According to one aspect of the presently disclosed subject matter, there is provided an image projector having a high optical efficiency which includes an illumination module having at least one spatially coherent light source; a phase image generator with an array of optical phase shifting elements; an electronic image controller in electrical communication with the phase image generator; and a waveguide positioned between the illumination module and an observer and having at least one embedded partial reflector.

According to some aspects, the phase image generator is positioned between the illumination module and the waveguide, or between the waveguide and the observer.

According to some aspects, the phase image generator is positioned at an entrance pupil of the waveguide or at an image of the entrance pupil.

According to some aspects, the phase image generator generates at least two diffraction orders which are coupled into the waveguide.

According to some aspects, the phase image generator is transmissive or reflective.

According to some aspects, the image projector includes a positive lens positioned between the waveguide and the phase image generator.

According to some aspects, phase image generator includes a liquid crystal display, a liquid crystal on silicon device, a holographic optical element, and/or a spatial light modulator.

According to some aspects, the phase image generator includes time-varying phase shifts for canceling speckle.

According to some aspects, the phase image generator includes phase shifts for correcting optical aberrations and/or compensating interference caused by rays having different optical path lengths.

According to some aspects, the at least one spatially coherent light source has an intensity which is modulated in time.

According to some aspects, the at least one spatially coherent light source includes a laser diode, a diode pumped solid-state laser, and/or a super-luminescent light emitting diode (SLED).

According to some aspects, the illumination module includes at least two light sources having different wavelengths.

According to some aspects, the illumination module also includes a focusing optical element.

According to some aspects, the focusing optical element is a lens, a mirror, or a biconic optical component.

According to some aspects, the at least one embedded partial reflector includes a diffraction grating, a diffractive optical element, and/or a partially reflecting surface.

According to some aspects, the image projector includes an image amplitude modulator.

According to some aspects, the image projector includes an optical beam splitter, which may be a polarizing beam splitter.

According to some aspects, the image projector includes a diffuser, which may be an etendue expander.

According to some aspects, the image projector includes a microlens array, one or more scanning mirrors, an eye tracking camera for tracking a current line of sight of an eye of the observer, and/or a Volume Bragg Grating.

BRIEF DESCRIPTION OF THE DRAWINGS

The invention is herein described, by way of example only, with reference to the accompanying drawings.

FIG. 5D is an optical schematic of an image projector according to another embodiment of the present invention.

FIG. 6A and FIG. 6B show optical schematics in a top view and in a side view, respectively, of an image projector 600A according to another embodiment of the present invention.

DESCRIPTION OF THE EMBODIMENTS

Figure 1:
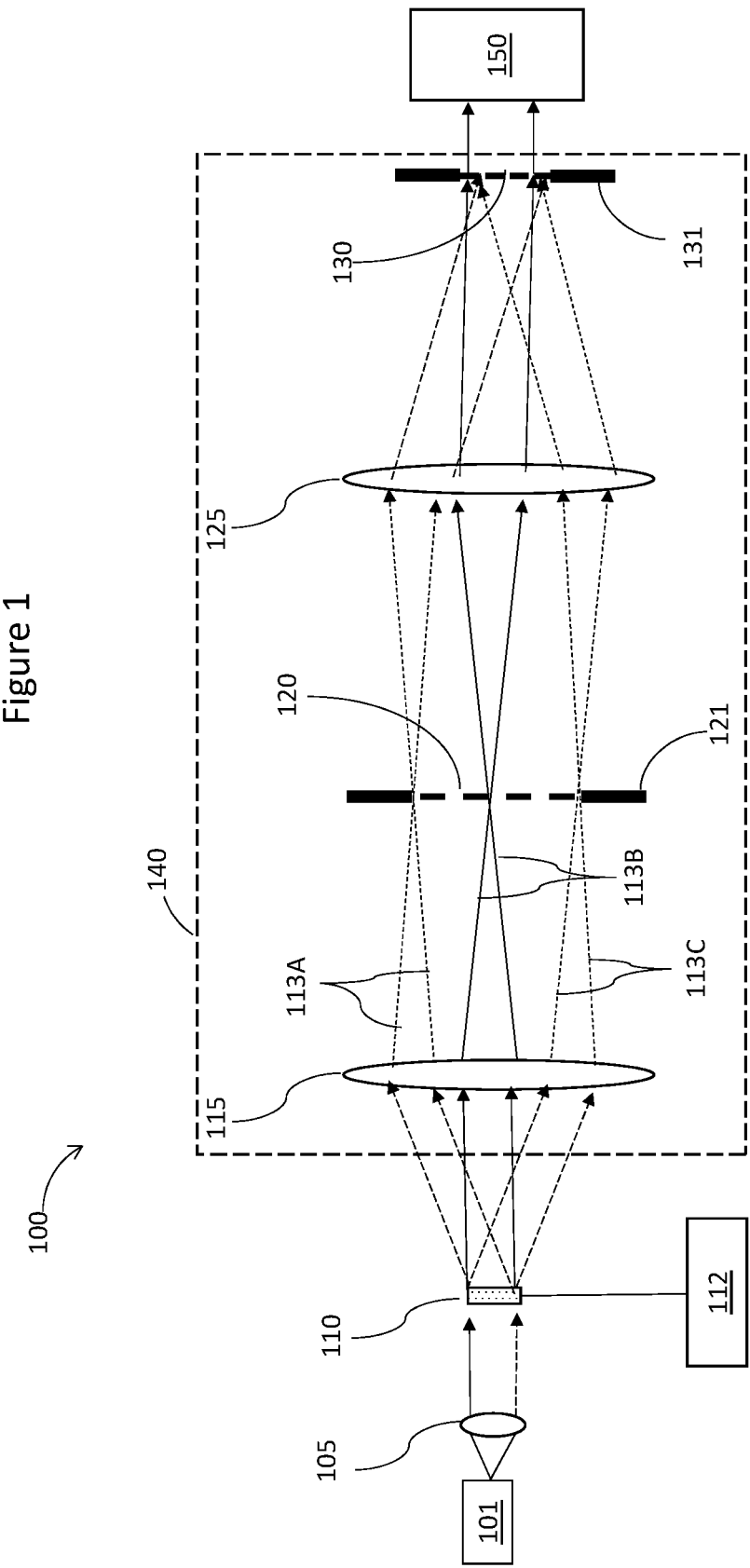
FIG. 1 is an optical schematic of an image projector according to a first embodiment of the present invention.

FIG. 1 shows a schematic representation of the optical layout of an image projector 100 according to the present invention. Illumination source 101 is a spatially coherent light source, such as a laser diode, a diode pumped solid-state laser (DPSS) or a super-luminescent light emitting diode (SLED). Color images are typically generated by alternating between red, green, and blue illumination sources in a time-varying periodic sequence.

A collimating optic 105 transmits light to a phase image generator 110, which receives electrical signals from an electronic image controller 112. The phase image generator may be implemented, for example, by a transmitting LCD, a reflective LCOS, or an HOE. The arrows 113A, 113B, and 113C illustrate sample ray paths corresponding to different angles of the incident illumination. Image controller 112 is typically implemented using a programmable digital computer.

Optics module 140 couples the illumination into a waveguide 150. A focusing optic 115 focuses the phase modulated light onto an image focal plane 120, shown by a dashed line. Spurious diffraction orders are blocked by an image aperture stop 121. A collimating optic 125 delivers light to an exit pupil 130 shown by a dashed line, inside an exit pupil stop 131. For high optical efficiency, the phase image generator 110 is preferably positioned at an image of the exit pupil 130. The light passing through exit pupil 130 is injected into waveguide 150.

As an option, a diffuser or a micro-lens array (MLA) may be positioned in the image focal plane 120 in order to expand the numerical aperture of the light cone entering the collimating optic 125. As another option, the image phase and/or amplitude may be approximated in order to enhance illumination efficiency.

Though not shown in FIG. 1, an image amplitude modulator, such as an LCD or an SLM, may be added to enable image manipulation in both phase and amplitude, without the use of additional optical elements. When positioned near to the phase image generator 110 or to the exit pupil 130, the added amplitude modulation, together with the phase modulation provided by the phase image generator 110, enables a complete reconstruction of a desired image. When positioned at or near to the image focal plane 120, the added amplitude modulation could be used to improve image quality, and typically would enable a better approximation of the desired image.

Approximation of the image in phase and/or in amplitude may optionally be used to enhance illumination efficiency. In addition, phase image generator 110 may be configured to divert light to selected portions of the amplitude modulator, in order to preserve light intensity. Furthermore, an amplitude modulator may be used to enhance image contrast by filtering out scattered light that would otherwise pass through the image focal plane.

Figure 2:
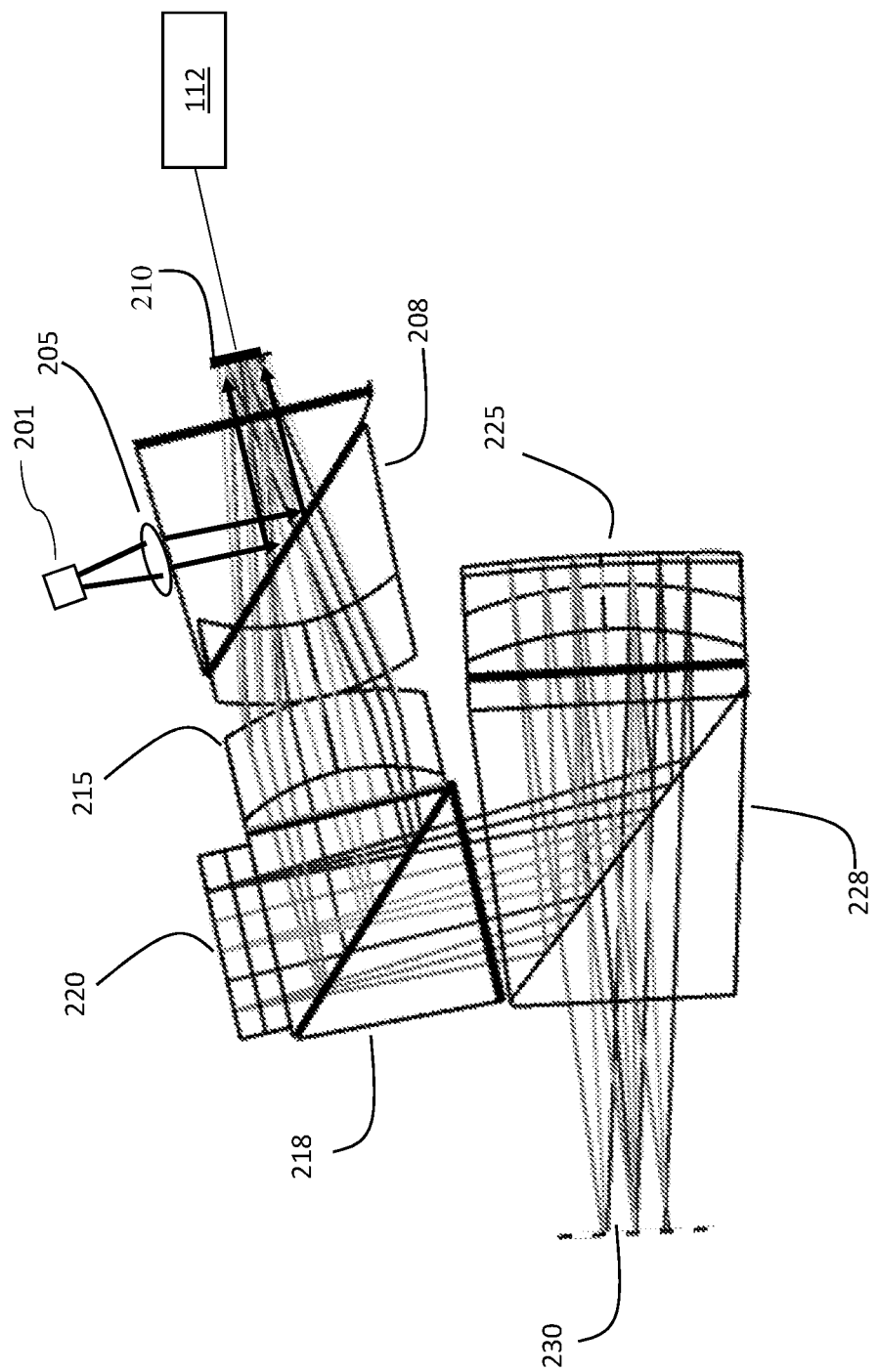
FIG. 2 and FIG. 3 show first and second exemplary optical layouts, respectively, for the image projector of FIG. 1.

FIG. 2 shows a first exemplary optical layout for the image projector of FIG. 1, using three polarizing beam splitters. Illumination source 201 is a polarized, spatially coherent light source, such as a laser diode or a diode pumped solid-state (DPSS) laser. A collimating optic 205 transfers the illumination to a polarizing beam splitter (PBS) 208, which reflects the light onto a reflecting phase image generator 210. The phase modulated light passes through focusing optic 215 and is reflected by PBS 218 onto image focal plane 220. PBS 228 reflects the light into collimating optic 225, and the light is then reflected into exit pupil 230. An optional amplitude modulator, such as an LCOS, may be positioned at image focal plane 220.

Figure 3:
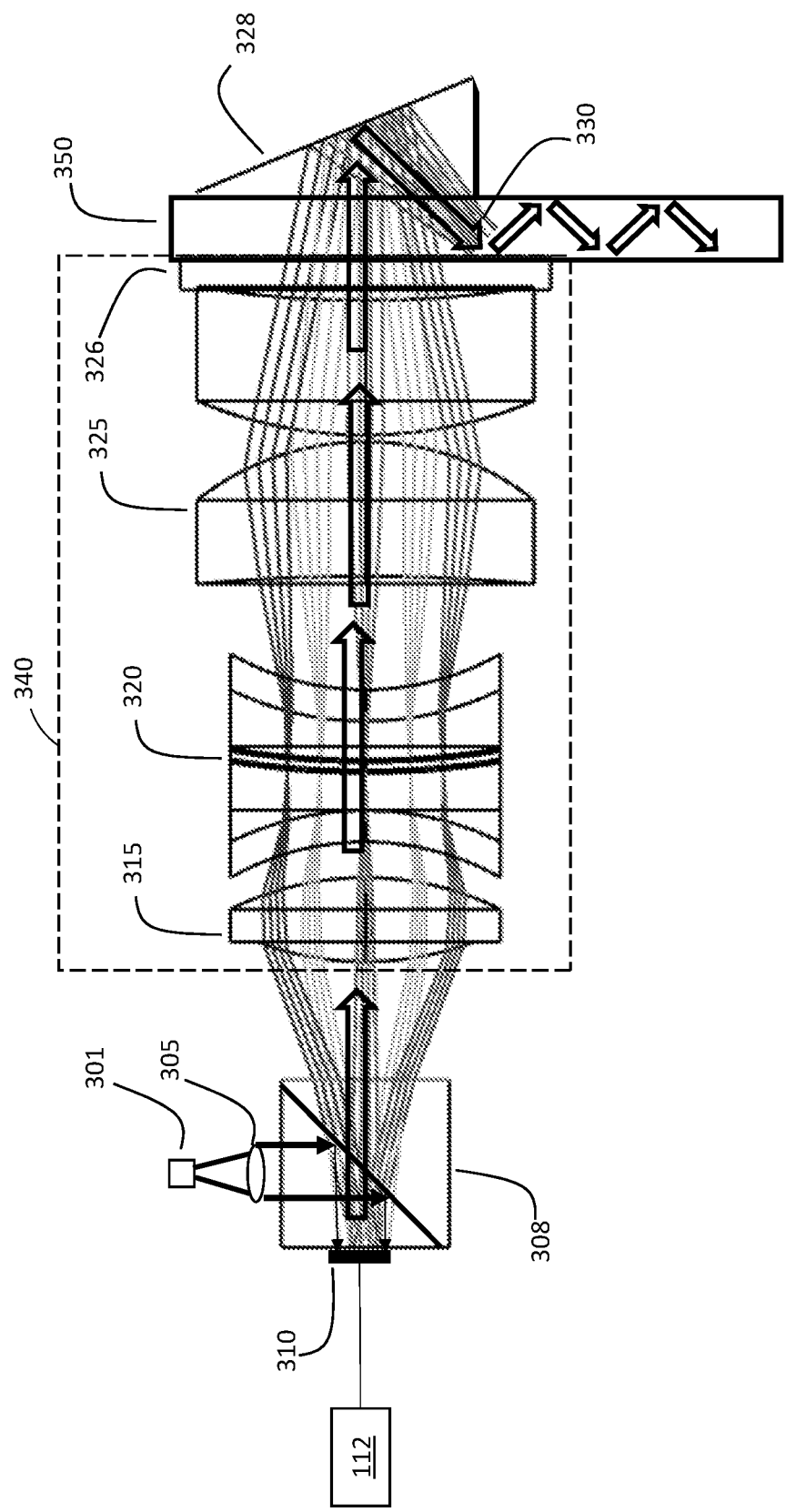

FIG. 3 shows a second exemplary optical layout for the image projector of FIG. 1, using refractive optical elements. Light from an illumination source 301 is collimated by a collimating optic 305 and diverted by a PBS 308 onto a reflecting image phase generator 310. The image phase generator is located on a plane that is imaged onto an exit pupil 330. Optics module 340 couples the illumination into a waveguide 350. Focusing optic 315 focuses the phase modulated light onto an image focal plane 320, which is curved due to the effects of field curvature. A curved MLA is optionally placed on image focal plane 320 in order to enlarge the numerical aperture of light entering into collimating optic 325. After collimation, the light is reflected by reflector 328 into exit pupil 330 and then coupled into waveguide 350.

In many cases it is desirable to depolarize the light emitted by the illumination source 301 before it enters into waveguide 350. For laser sources having a narrow spectral width, a depolarizing plate would normally be thick and impractical for use in a compact image projector. An alternative solution which is more practical is to use two laser sources, having slightly different wavelengths, for each of the three illumination colors (e.g. red, green, and blue). In FIG. 3, a birefringent window 326 is configured to cause the light from the two laser sources to have orthogonal polarizations. By this technique, six images (e.g. 2 for red, 2 for green, and 2 for blue) are generated in sequence in the image phase generator, and the resulting color image is effectively depolarized. Each of the six images typically requires a different phase pattern in the phase image generator.

Figure 4B:
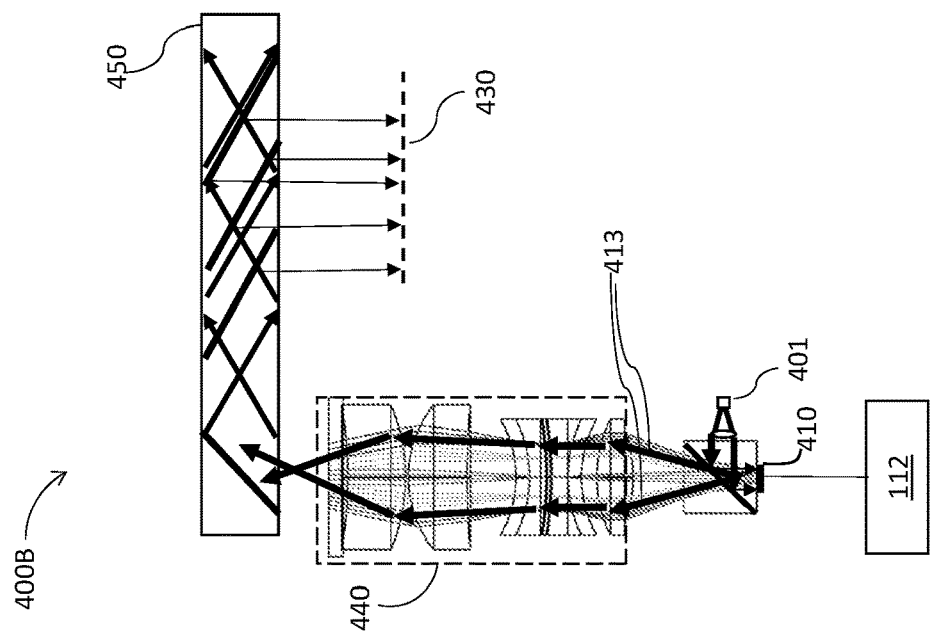
FIG. 4B is an optical schematic of an image projector according to another embodiment of the present invention.
Figure 4A:
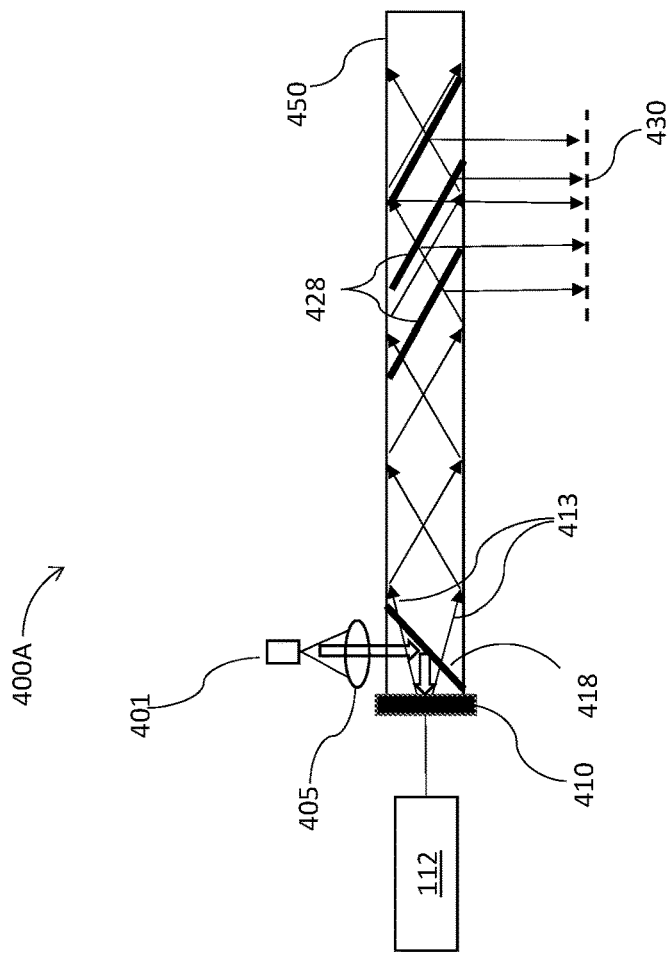
FIG. 4A is an optical schematic of an image projector according to another embodiment of the present invention.

FIG. 4A shows an optical schematic of an image projector 400A according to another embodiment of the present invention. Light from a polarized illumination source 401 is reflected by PBS plane 418 onto phase image generator 410. The latter generates the diffractive orders 413, corresponding for example to diffractive orders +1 and −1, which are mirror images of each other, and which generate two images of opposite orientation. The diffractive orders propagate through waveguide 450 by total internal reflection (TIR) at the surfaces of the waveguide, as shown, and are coupled to the output plane 430 by embedded partial reflectors 428. The partial reflectors may be implemented for example, as diffraction gratings, DOE's, or partially reflective surfaces.

FIG. 4B shows an optical schematic of an image projector 400B according to another embodiment of the present invention. In this case, phase image generator 410 is located at an image of the entrance to waveguide 450, and optics module 440 is used to couple the illumination from source 401 into the waveguide. The elements of optics module 440 are analogous to those of optics module 340 in FIG. 3.

In FIGS. 4A and 4B, two images are injected into the waveguide, as compared to a single image in the embodiment of FIG. 3. In fact, the embodiments of FIGS. 4A and 4B may also be extended to include the injection of four images, by using a two-dimensional waveguide. Furthermore, the waveguide can be configured to include a birefringent section or window. Additional details are provided in International Application number WO 2018/065975A1, published 12 Apr. 2018, and entitled "Aperture Multiplier Using a Rectangular Waveguide".

In FIGS. 4A and 4B, the phase image generator 410 reflects the incident illumination towards the waveguide 450. However, alternative embodiments are possible in which the phase image generator is transparent, and the incident illumination enters on the side of the phase image generator which is opposite to that shown in FIGS. 4A and 4B.

Figure 5A:
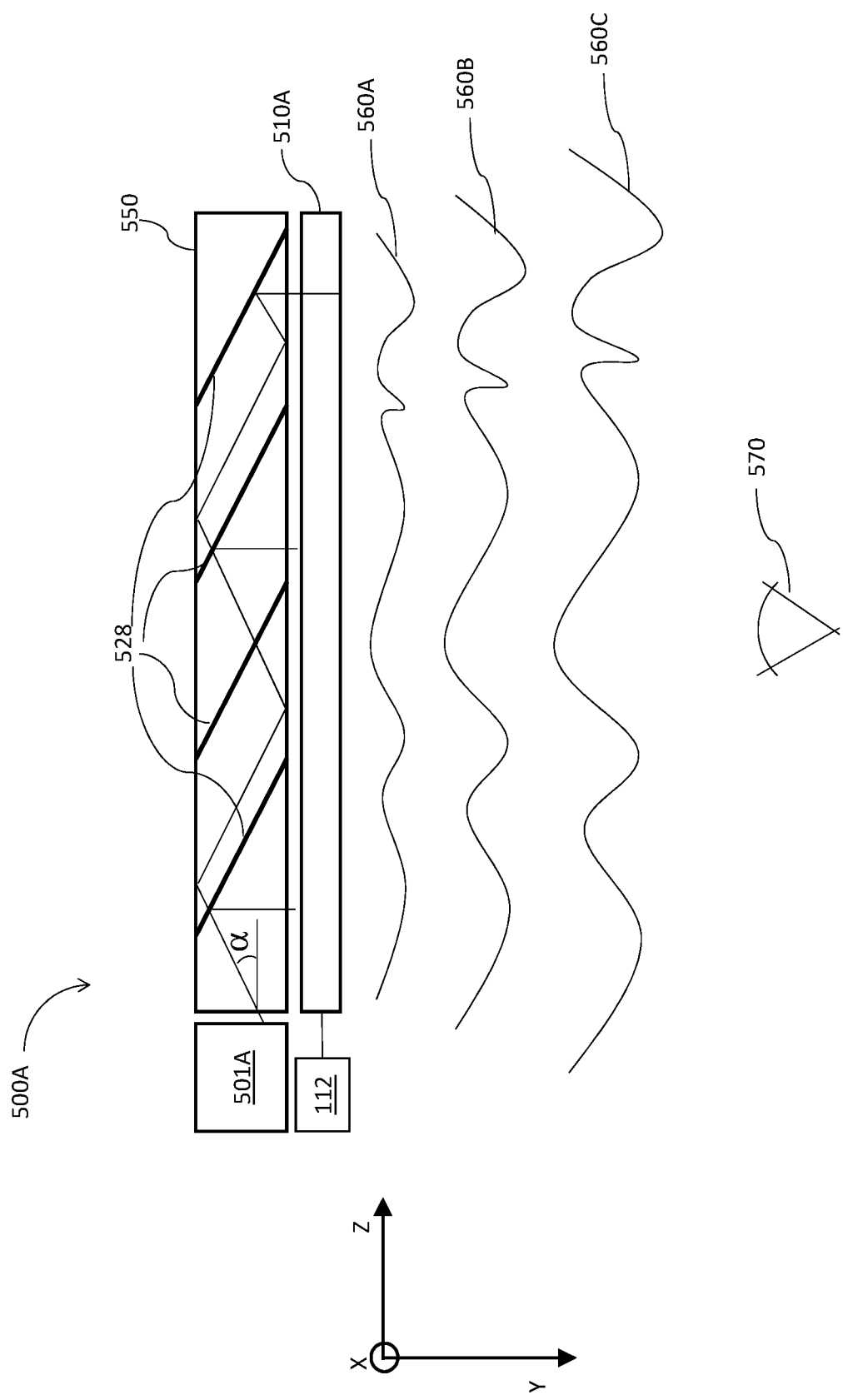
FIG. 5A is an optical schematic of an image projector according to another embodiment of the present invention.

FIG. 5A shows an optical schematic of an image projector 500A according to another embodiment of the present invention. An illumination module 501A injects a coherent light beam having a uniform phase front (e.g. a flat wavefront) into waveguide 550 at an injection angle α with respect to the long axis of the waveguide, which is parallel to the Z-axis of the X-Y-Z coordinate frame. Embedded partial reflectors 528 essentially expand the wavefront and couple the light into an SLM 510A, which is an optical phase and/or amplitude modulator. For Augmented Reality (AR) applications, the SLM is preferably a transmissive, phase-only modulator, such as an LCOS, which does not block ambient light. Waveguide 550 essentially serves as a thin illumination source for the SLM, which modulates the incident phase front to generate a desired image. The SLM can also compensate for differences in the relative phases of light waves reflected from different reflectors 528, so as to eliminate unwanted interference effects.

The injection direction α is changed in illumination module 501A, for example, by means of scanning micromirrors (not shown). Each such direction corresponds to a specific direction of the holographic image projection. By changing a, the projected image can be scanned over a larger field-of-view (FOV) than that provided by the SLM. The output phase fronts 560A, 560B, and 560C transmit the image information to the observer 570.

Figure 5B:
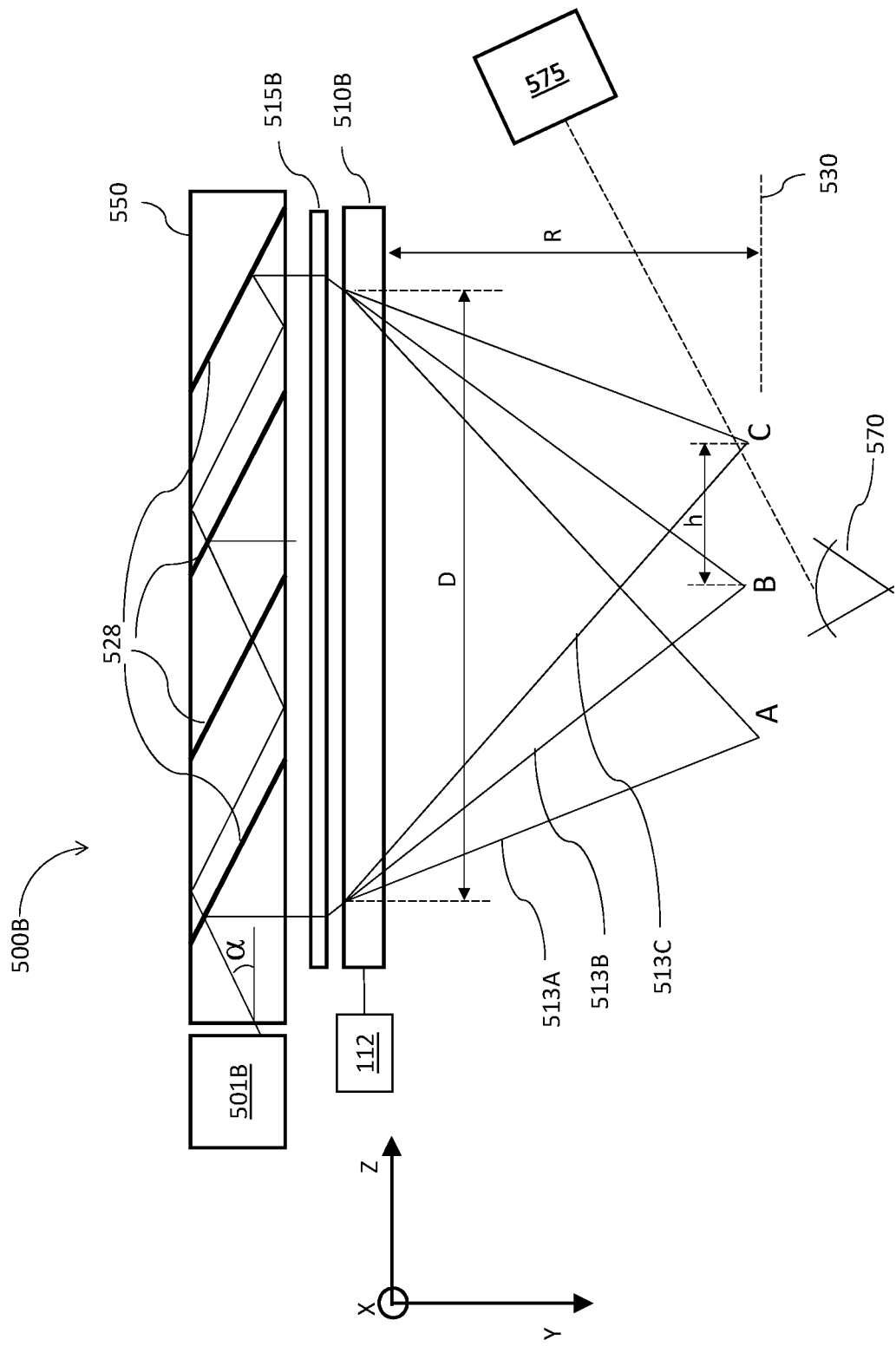
FIG. 5B is an optical schematic of an image projector according to another embodiment of the present invention.

FIG. 5B shows an optical schematic of an image projector 500B according to another embodiment of the present invention. An illumination module 501B injects a coherent light beam along direction α into waveguide 550. Positive lens 515B, which is interposed between waveguide 550 and SLM 510B, focuses coherent light but does not impact ambient light. Lens 515B may be implemented, for example, as a holographic surface or a Volume Bragg Grating (VBG) diffraction element which is configured to have high diffraction efficiency in a narrow spectral range. More generally, lens 515B may consist of three VBG elements stacked together so that each VBG diffracts a specific wavelength corresponding to red, green, or blue illumination.

A positive lens 515B can also be located between the SLM 510B and the observer. Possible aberrations of the lens 515B can be compensated by additional phase shifts applied to the pixels of the SLM. The SLM generates diffraction orders 513A, 513B, and 513C, which are focused at positions A, B, and C, respectively, in the output focal plane 530 of lens 515B. The separation distance between points B and C is denoted by (h) in FIG. 5B.

If the separation distance (h) is large enough, e.g. larger than the eye pupil diameter of observer 570, the observer sees only one diffraction order at a time. If the separation distance is less than a desired Eye Motion Box (EMB), as in the case of a relatively large SLM pixel pitch, it is necessary to control the position of one of the diffraction orders, for example position B, so that it tracks the instantaneous position of the eye pupil of the observer 570. The control of position B in the focal plane 530 is effected by adjusting the injection direction α. The instantaneous eye position of the observer 570 is localized within an Eye Motion Box (EMB) by means of an eye-tracking camera 575 for tracking a current line of sight of the eye of the observer. Essentially, each injection direction corresponds to a path of the illumination beam inside the waveguide and produces a specific position of the diffraction order B in the focal plane 530.

The system parameters governing the operation of projector 500B are listed in Table 1 below.

TABLE 1

| Symbol | Definition |
| --- | --- |
| R | eye relief distance |
| D, p | width and pixel pitch of the SLM |
| λ | illumination wavelength |
| Fi, Fd | waveguide (illumination) and display FOV's |
| H | distance between diffraction orders |
| W | EMB width. |

The system parameters are related by following mathematical equations:

$$Fd = 2 * \mathrm{atan}\left(\frac{D}{2R}\right) \quad (1)$$

$$h = R * \tan\left(\frac{\lambda}{p}\right) \quad (2)$$

$$W = 2 * R * \tan(Fi/2) \quad (3)$$

Numerical Example

As an example, given R=20 mm and Fd=38.6 degrees (for a square display with a diagonal of 50 degrees), equation (1) yields D=13.2 mm Equation (2) is approximate. For p=3 microns and =0.447 microns, which corresponds to blue light, equation (2) yields h=3 mm, which is approximately the diameter of an eye pupil. The SLM would then contain at least N×N pixels, where N=D/p=4400. For W=±5 mm (or a total of 10 mm), equation (3) yields, approximately, Fi=±14 degrees.

Figure 5C:
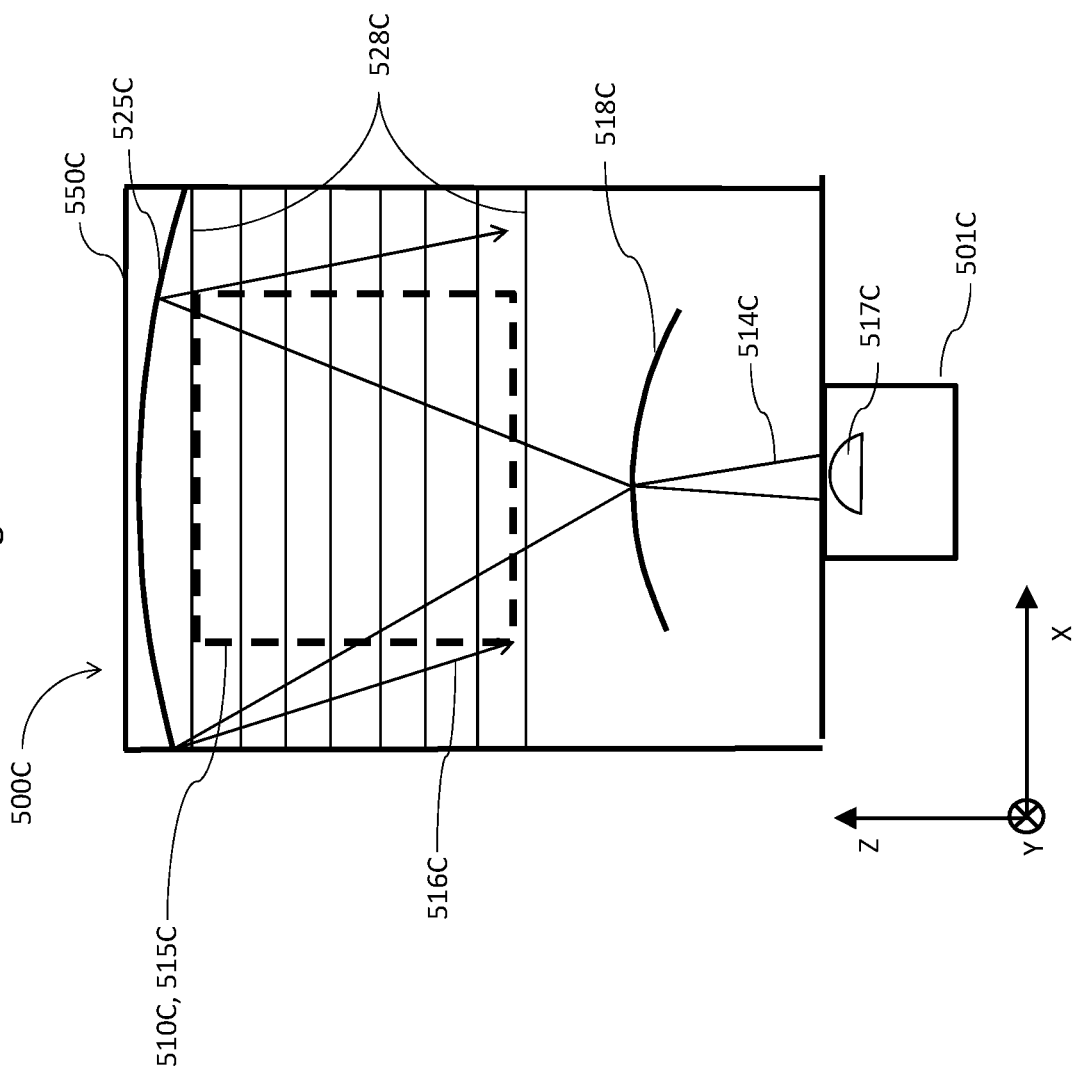
FIG. 5C is an optical schematic of an image projector according to another embodiment of the present invention.

FIG. 5C shows an optical schematic of an image projector 500C according to another embodiment of the present invention, which uses a transparent two-dimensional (2D) waveguide 550C. Coherent illumination module 501C includes a cylindrical optic 517C, which can be implemented, for example, as a lens, a mirror, or a biconic optical component. The illumination is focused into a beam 514C which is collimated in the Y-Z plane and focused in the X-Z plane (e.g. the plane of the waveguide) onto a diffuser 518C. The diffuser acts as an etendue expander, which increases the divergence angle of the beam in the X-Z plane.

Cylindrical mirror 525C reflects the beam to form a back-propagating collimated beam 516C. Beam 516C is ejected from the 2D waveguide 550C by embedded partial reflectors 528C, towards lens 515C and SLM 510C (shown by dashed lines). Further details regarding 2D waveguide imaging systems are found in International Application No. PCT/IL2020/051114, filed 25 Oct. 2020, and entitled "Displays Employing Astigmatic Optics and Aberration Compensation".

FIG. 5D shows an optical schematic of an image projector 500D according to another embodiment of the present invention. Instead of the illumination module 501C and the etendue expander 518C of FIG. 5C, the projector in FIG. 5D includes a coherent illumination module 501D. Module 501D contains 4 illumination sub-modules—503A, 503B, 503C, and 503D. Each of the sub-modules contains 4 emitters, so that module 501D contains a total of 4×4=16 emitters in all. Assuming a separation distance of 3 mm between the diffraction orders (as indicated by parameter h in FIG. 5B), the 4×4 array can cover a 12 mm×12 mm EMB. Different array sizes are possible depending on the desired size of the EMB; for example, for a smaller EMB, a smaller array sizes may be used. The emitters are switched on and off, with one operating at any given time, and the diffraction orders produced by SLM 510C generate images at different positions in the focal plane of the lens 515C. The advantage of image projector 500D is that it obviates the need for a scanning mirror or for additional optics modules, such as module 340 in FIG. 3, module 440 in FIG. 4B and module 501C in FIG. 5C.

Figure 5F:
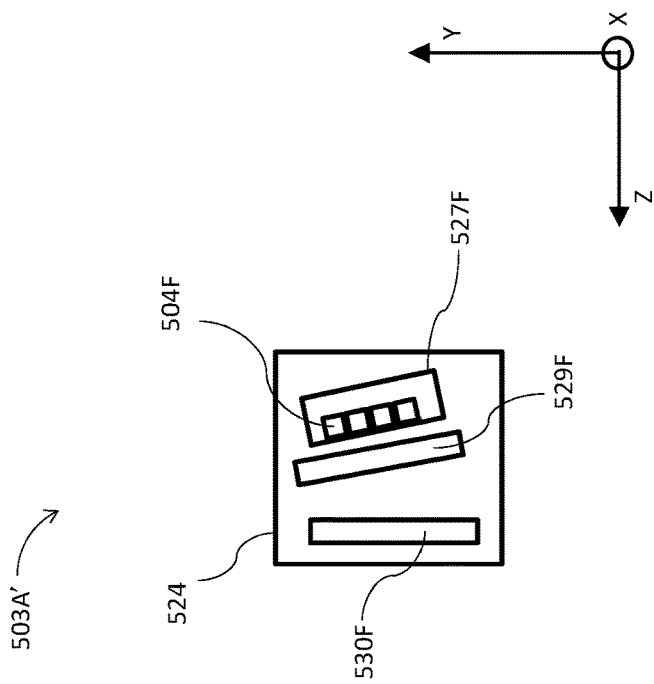
FIG. 5E and FIG. 5F show first and second arrangements, respectively, of emitters inside an illumination sub-module of FIG. 5D.
Figure 5E:
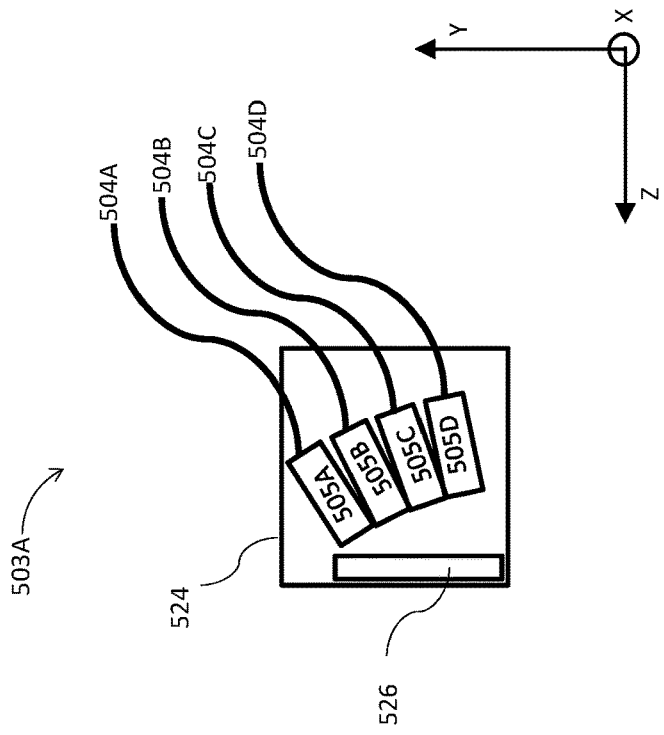

FIG. 5E shows a first arrangement of emitters inside an illumination sub-module 503A, of image projector 500D. A similar arrangement applies to sub-modules 503B, 503C, and 503D. Optical fibers 504A, 504B, 504C and 504D provide illumination to micro-optical collimators 505A, 505B, 505C, and 505D, respectively, each aligned to a different injection angle. The collimated light is collected by cylindrical optic 526 and injected into the waveguide 550C so that the light from each of the optical fibers is collimated in the plane Y-Z plane (e.g. the plane normal to the plane of the waveguide) and is divergent in the plane X-Z plane (e.g. the plane of the waveguide). Holder 524 provides mechanical support to keep all elements properly aligned.

FIG. 5F shows, as an alternative, a second arrangement of emitters inside an illumination sub-module 503A', of image projector 500D. Four coherent sources 504F, for example semiconductor laser diode chips, are integrated on a single substrate inside package 527F. The emitted beams diverge in the X-Z plane of the waveguide and are collimated in the Y-Z plane (e.g. the plane normal to the plane of the waveguide) by MLA 529F and MLA 530F.

FIGS. 6A and 6B show optical schematics of an image projector 600A in a top view and in a side view, respectively, according to another embodiment of the present invention. Illumination source 601 incorporates a phase image generator 610 and a cylindrical or biconic optic 615 which focuses the diffraction orders 613A and 613B onto the plane of diaphragm 616. The diaphragm transmits diffraction order 613A and blocks diffraction order 613B, as shown. Cylindrical mirror 625 reflects the transmitted light back into waveguide 650, whose embedded partial mirrors 628 eject the image toward the observer 570. The ratio of focal lengths f1 and f2, corresponding to optic 615 and to cylindrical mirror 625, respectively, determines the magnification of the image FOV in one spatial dimension. Image projector 600A has the advantage of being highly compact, however, the diffraction-order blocking and the image magnification in this projector are limited to the plane of the waveguide 650.

Considerations for determining the phase patterns of the phase image generator are presented in the following sections.

Speckle Suppression

When a coherent illumination source is used in an image projector, speckle can degrade the imaging quality. To mitigate the effects of speckle, a random, time-varying, global phase shift can be added to the 2D array of pixels in the phase image generator, or in a separate dedicated phase modulator which consists of a single pixel. Time-averaging of successive images in the eye of the observer significantly reduces speckle artifacts.

A single-pixel dedicated phase modulator for speckle suppression would typically require a switching time which is less than one millisecond. Low-power phase modulators typically have longer switching times. An inexpensive implementation having the requisite switching time can be constructed by combining several low power phase modulators in series, with sub-millisecond delays between them.

Optical Path Length Compensation

Light injected into a 2D waveguide is reflected from a multiplicity of embedded partial reflectors inside the waveguide. The reflected rays, which extend over the area of the waveguide and differ in position and orientation, have different optical path lengths, and would therefore give rise to interference effects in the observer's FOV. To eliminate interference effects, additional phase shifts that compensate for optical path length differences may be encoded into the phase pattern of the phase image generator.

The spatial and temporal coherence length of the illumination source determines the type of encoding required. In one mode of operation, for example in the case of a distributed feedback (DFB) laser diode, the temporal coherence length is large compared to the exit pupil of the waveguide (i.e. the area of the waveguide from which light is coupled out to the eye of the observer, for a given location of the eye). Using an eye tracker, such as the eye tracking camera 575 in FIG. 5B, the location of the eye is accurately known, and then all optical path length differences can be calculated and encoded into the phase image generator. In this manner full 3D imaging can be achieved.

In a second mode of operation, the temporal coherence length of the illumination source is shorter than the exit pupil of the waveguide but longer than the diameter of the eye pupil of the observer. For images projected to infinity, each pixel in the image plane is composed of a single angular orientation (e.g. a single "k-vector") of the projected light, and different angular orientations do not interfere. In this case, accurate knowledge of the eye position is not required.

Aberration Correction

The phase shifts encoded in the 2D array of pixels of the phase image generator may also include terms which correct for optical aberrations originating in the optics of the image projector itself. Such corrections are described in further detail in International Application No. PCT/IL2020/050700, filed 23 Jun. 2020, and entitled "Display with Foveated Optical Correction".

It will be appreciated that the above descriptions are intended only to serve as examples, and that many other embodiments are possible within the scope of the present invention as described above.

The invention claimed is:

1. An image projector comprising:
   an illumination module comprising at least one spatially coherent light source;
   a phase image generator comprising an array of optical phase shifting elements;
   an electronic image controller in electrical communication with the phase image generator; and
   a waveguide interposed between the illumination module and an observer and comprising at least two embedded partial reflectors;
   wherein the phase image generator is interposed between the illumination module and the waveguide, or between the waveguide and the observer, and the phase image generator includes phase shifts for correcting optical aberrations.

2. The image projector of claim 1 wherein the phase image generator is positioned at an entrance pupil of the waveguide or at an image of the entrance pupil.

3. The image projector of claim 1 wherein the phase image generator generates at least two non-zero diffraction orders which are coupled into the waveguide.

4. The image projector of claim 1 wherein the phase image generator is reflective and a positive lens is interposed between the waveguide and the phase image generator or between the phase image generator and the observer.

5. The image projector of claim 1 wherein the phase image generator comprises a component selected from a group consisting of a liquid crystal display, a liquid crystal on silicon device, a holographic optical element, and a spatial light modulator.

6. The image projector of claim 1 wherein the phase image generator includes time-varying phase shifts for canceling speckle.

7. The image projector of claim 1 wherein the phase image generator includes phase shifts for compensating interference caused by light rays having different optical path lengths.

8. The image projector of claim 1 wherein the at least one spatially coherent light source has an intensity which is modulated in time.

9. The image projector of claim 1 wherein the at least one spatially coherent light source comprises a component selected from a group consisting of a laser diode, a diode pumped solid-state laser, and a super-luminescent light emitting diode (SLED).

10. The image projector of claim 1 wherein the illumination module comprises at least two light sources having different wavelengths.

11. The image projector of claim 1 wherein the illumination module further comprises a focusing optical element which comprises a lens, a mirror, or a biconic optical component.

12. The image projector of claim 1 wherein the at least one embedded partial reflector comprises a component selected from a group consisting of a diffraction grating, a diffractive optical element, and a partially reflecting surface.

13. The image projector of claim 1 further comprising an image amplitude modulator.

14. The image projector of claim 1 further comprising an optical beam splitter which comprises a polarizing beam splitter.

15. The image projector of claim 1 further comprising a microlens array and/or a diffuser which is an etendue expander.

16. The image projector of claim 1 further comprising one or more scanning mirrors.

* * * * *